United States Patent [19]

Adolphi et al.

[11] Patent Number: 5,534,963
[45] Date of Patent: Jul. 9, 1996

[54] POSING STATION

[75] Inventors: John Adolphi, Eden Prairie; Jeffrey J. Kipp, Minneapolis, both of Minn.

[73] Assignee: Lifetouch Portrait Studios, Inc., Minneapolis, Minn.

[21] Appl. No.: 412,595

[22] Filed: Mar. 29, 1995

Related U.S. Application Data

[63] Continuation of Ser. No. 887,188, May 21, 1992, abandoned.

[51] Int. Cl.⁶ .................................................. G03B 15/00
[52] U.S. Cl. .......................................... 354/290; 354/292
[58] Field of Search .................................... 354/290, 291, 354/292, 80, 81; 352/242; 108/77

[56] References Cited

U.S. PATENT DOCUMENTS

| | | | |
|---|---|---|---|
| 59,974 | 11/1866 | Cutler | 108/77 |
| 238,495 | 3/1881 | Erdin | 108/77 |
| 1,015,292 | 1/1912 | Calhoun . | |
| 1,816,290 | 7/1931 | Klimis . | |
| 2,258,782 | 10/1941 | McKean | 108/77 |
| 3,336,881 | 8/1967 | Aiken | 108/77 |
| 3,340,827 | 9/1967 | Sims | 108/77 |
| 3,643,085 | 2/1972 | Durand . | |
| 3,952,322 | 4/1976 | Wolfe | 354/290 |
| 4,150,893 | 4/1979 | Ueno et al. . | |
| 4,166,687 | 9/1979 | Viering . | |
| 5,023,638 | 6/1991 | Siegesleuthner et al. | 354/290 |
| 5,067,049 | 11/1991 | Milaire | 354/290 |

FOREIGN PATENT DOCUMENTS

| | | | |
|---|---|---|---|
| 2113398 | 10/1972 | Germany | 108/77 |
| 3222817 | 12/1983 | Germany | 108/77 |

*Primary Examiner*—Monroe H. Hayes
*Attorney, Agent, or Firm*—Haugen and Nikolai

[57] ABSTRACT

A posing station for a portrait studio which allows for great flexibility in the taking of subjects' portraits. The posing station can be converted between a seating area with an aisle behind it for group photographs and an expansive surface for baby and small children photographs.

The posing station is linked to a frame which supports the rest of the portrait studio equipment including the lighting, camera and backdrops. This results in all the critical distances between the studio equipment remaining fixed. The studio can also be automated so that the photographer need a minimum of effort while producing expert quality photographs.

15 Claims, 5 Drawing Sheets

POSING STATION

This application is a continuation of U.S. application Ser. No. 07/887,188, filed May 21, 1992, now abandoned.

TECHNICAL FIELD

The present invention relates to a photographic portrait studio, including a posing station utilized in the portrait studio.

BACKGROUND OF THE INVENTION

Photographic studios typically are designed to be flexible in order to accommodate taking portraits of entire families, as well as smaller groups, individuals or babies.

While the type of equipment and flexibility of various portrait arrangements vary, portrait studios typically have several things in common. The subject or subjects to be photographed are aesthetically positioned on or around a chair, stool, or other posing station, and a backdrop containing a selected background design is placed behind them. Strobe lighting is used to properly illuminate the subjects, usually from at least two angles to create the proper balance of light and shadows. After the equipment is readied, several poses are usually taken.

The subjects wishing to have their pictures taken can range from a group or family to a single individual or a baby. The posing area and overall portrait studio, therefore, should be readily adaptable to the variety of potential subjects. Prior art posing stations, however, such as the one depicted in U.S. Pat. No. 4,166,687, are often designed for only one type of subject, such as infants or toddlers, thereby restricting the range of subjects that can be photographed.

Even those studios that are able to photograph different types of subjects have significant drawbacks. For example, babies are a frequent subject of photographs and a posing station must ensure the safety of the child while the photograph is being taken but not distract from the picture by having safety features visible in the picture. The posing station must also be able to accommodate groups of people where some people will traditionally be standing and some sitting. Most prior art posing stations either are not able to accommodate both babies and large groups or else are convertible between the different setups only with great difficulty.

To be profitable, portrait studios must operate quickly and efficiently. A studio should be simple to operate and be easily adaptable to different photographic settings. Furthermore, the studio should be able to operate under a variety of conditions and with as few adjustments as possible. Many of the prior art studios require the photographer to reposition the backdrops, lighting and camera between each separate shot, all of which leads to lost time and productivity, as well as increasing the likelihood of errors in the photographs.

A need exists, therefore, for a self-supported portrait studio and related equipment that can accommodate a large variety of portrait subjects in a quick and efficient manner, and that can be properly adjusted with a minimum amount of mental or physical effort from the photographer.

SUMMARY OF THE INVENTION

The invention provides a photographic posing station which can be integrated into an overall portrait studio. The posing station includes a stationary base and a removable platform. The base and platform include positioning means for positioning the platform on the base. The positioning means typically comprise pegs extending from the bottom of the platform and corresponding holes on the base. By placing the pegs into the holes, the platform can accurately and quickly be placed in its proper orientation on the base.

A span is movable between a first extended position and a second stored position, and is at least partially supported by the platform in the extended position. The span allows the posing station to easily adapt to a variety of photographic subjects. For example, if a baby is to be photographed, the span is extended and the baby is placed approximately in the center of the rather expansive posing station surface. If, however, a group is to be photographed, the span is retracted to its stored position and the group members may be arranged so that some are sitting on the platform and some are standing behind the platform.

In the preferred embodiment, the base is attached to a frame to which is also attached at least one backdrop, the subject lighting, and preferably, the camera. In this way, the distances between all the major studio components remain fixed and, once set, require no further adjustments.

Also in the preferred embodiment, the studio includes a central processing unit with data storage capacity. Any studio operations or variations, such as the sequencing and preparation of pictures, is performed by the central processing unit, thereby freeing the photographer of these tasks and helping to ensure that high quality photographs are consistently produced.

DETAILED DESCRIPTION OF THE INVENTION

Figure 1:
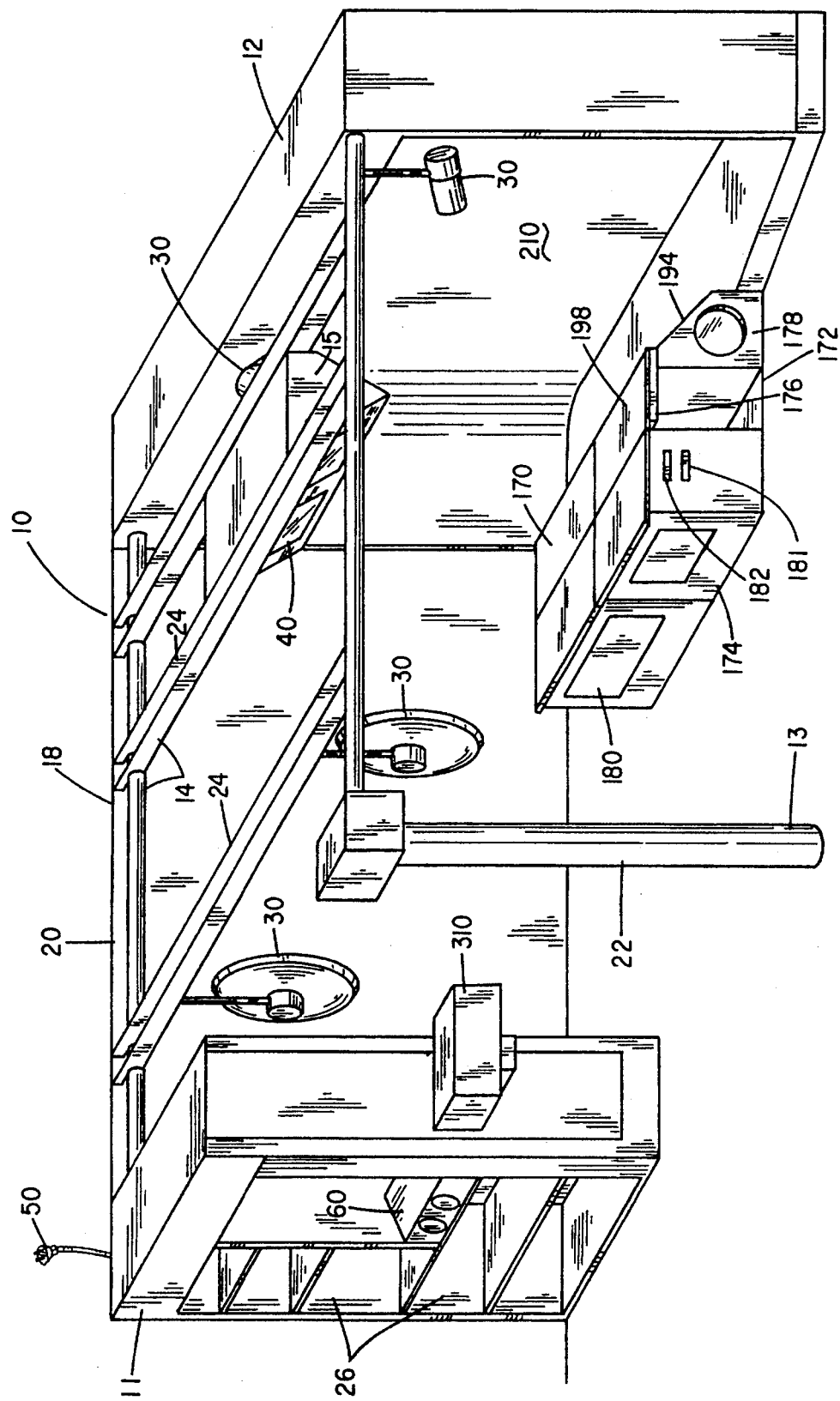
FIG. 1 is a perspective view of the portrait studio.

The photographic apparatus comprising the integrated, self-supported portrait studio, generally designated 10 in FIG. 1, includes a frame 18, a camera 310, a backdrop 210, lighting 30, a posing station 170 and an optional video monitor 40.

The frame 18 offers support to the other components, defines the environment in which the photographs are taken, and spatially locates the various components with relation to one another. The frame 18 is desirably made up of a pedestal unit 11, a background unit 12, a post unit 13 and a rail system 14. These units define generally the boundaries of the studio. The rail system 14 links the units together and acts as a conduit for the electrical wires and supports the overhead subject lights 30 as well as the video monitor cabinet 15. The studio's dimensions can vary and the post unit 13 and the pedestal unit 11 can be used interchangeably. The rail system 14 is made up of longitudinal beams 20 which desirably link the background unit 12 to the pedestal unit 11 and the post unit 13, and lateral beams 24 which link the longitudinal beams 20. The beams can be made of telescopic members, the smaller members slidably residing within the larger ones, which allow the studio to adapt to the size of the area in which it will be located. In the preferred embodiment, however, the lateral beams 24 are at a fixed length of 8 feet and the longitudinal beams 20 are constructed of two separate members, each consisting of a pre-set length. In the preferred embodiment, the overall dimensions of the portrait studio are desirably 8' wide by 15' long by 8.5' high. These dimensions provide ample area for most family settings while allowing the studio to be erected in a reasonably small room.

The portrait studio desirably contains one master column 22 constructed of a suitable design and material. In the preferred embodiment, the pedestal unit 11 contains shelving 26 which allow the photographer to store equipment, inventory or props in a convenient yet unobtrusive manner. The shelving 26 can also house a central processing unit 60. The pedestal unit 11 and the shelves 26 contained therewith, do not need to be uniform in size or shape and can be modular to allow for easy adaptation for storage of different types of equipment.

As mentioned, the beams 20, 24 desirably link the units and longitudinally and laterally traverse the studio 10. The subject lights 30 can be carded by either the longitudinal 20 or lateral beams 24. These lights illuminate the subjects on the posing station 170. Two lights are typically employed for sufficient frontal lighting and the present invention is capable of supporting additional lights, such as background lights, hair lights, side lights, etc. The number and wattage of the lights will be dictated by the individual studio requirements and the particular photographer's needs.

A posing station 170 is situated on the floor of the studio between the camera 310 and the backdrop 210. The posing station 170 consists of at least one platform 174 with a span 176, a rear support 178 and a base 172 which is attached to the background unit 12.

The platform 174 and support 178 are located on the base 172. Any suitable configuration and material capable of supporting the components will suffice for the base 172. Preferably however, it is formed of Plexiglas (or similar material) and is generally rectangular in shape.

Located on the rear of the base 172 is a support 178. The support is desirably permanently affixed to the base 172 by appropriate attachment means. In the preferred embodiment, the support 178 has a flat top surface 190 and a front surface 192 which is preferably vertical. The back surface 194 slopes downwardly from the top 190 opposite the front 192 and terminates in a back vertical section which is parallel to the front surface of the support 178. In one preferred embodiment, the height of the support 178 is desirably approximately 21¾ inches while the length of the support 178 generally corresponds to the length of the base 172.

In a preferred embodiment, the platform is comprised of two separate but virtually identical platforms 174 located on the end of the base 172 a set distance from the support 178. The platforms 174 sit adjacent to each other and, like the support 178, desirably extend the entire width of the base 172. Although desirably two platforms are used (for ease of moving, etc.), any suitable number of individual sections could be used. The platforms 174 preferably are generally rectangular shaped, desirably 22 ½ inches by 12 inches by 22½ inches, although other suitable configurations or dimensions could also be used.

Attached to each of the platforms is a span 176 that allows the posing station to accommodate a wide variety of portrait subjects. The span 176 is preferably attached to the platform 174 at the platform's uppermost edge on the side closest to the support 178. Any suitable attachment means can be employed, however, in the preferred embodiment, the span 176 is attached to the platform 174 through the means of a hinge 188 (desirably a piano hinge).

Figure 2:
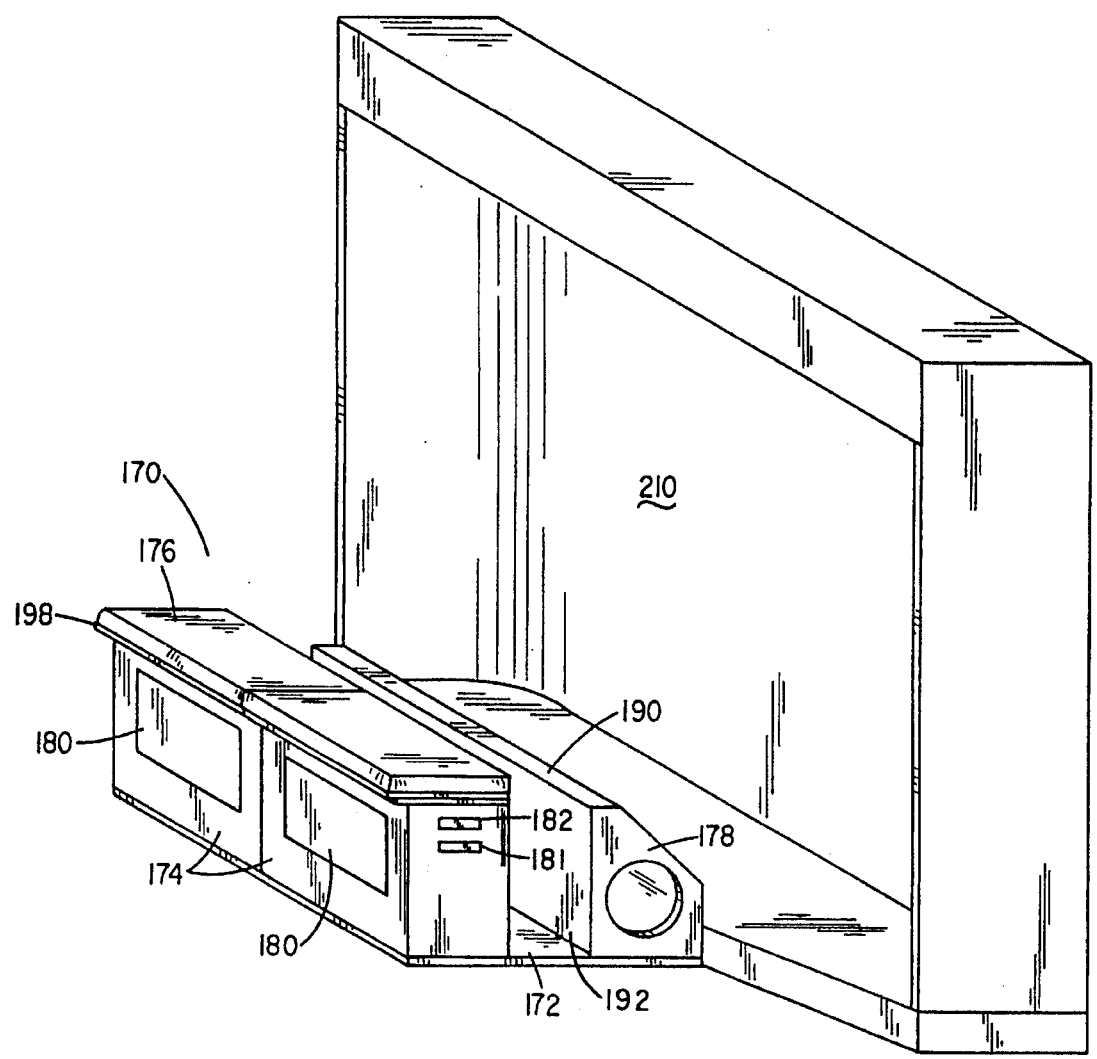
FIG. 2 is a perspective view of the posing station with the span retracted.

The span's length and width are similar to that of the top surface of the platform 174. Thus, when the hinge 188 is closed, the span 176 is capable of resting on the top of the platform 174 with only a slight overhang as shown in FIG. 2. Conversely, with the hinge 188 in its fully opened position, the span 176 extends outwardly away from the platform 174 towards the rear of the base 172. Alternately, the span might be stored within a recess in the platform 174 and be slidably extendable outward from the back of the platform 174.

The platforms 174 are placed a set distance away from the support 178 so that an aisle exists between them. The width of the aisle between the platforms 174 and the support 178 is desirably such that the spans 176 rest upon the top surface of the support 190 when they are fully extended from the platform 174. The flat configuration of the support's top surface 190 ensures that the spans 176 remain level when extended from the platforms 174.

In the preferred embodiment, the back vertical surface of the platforms 174 do not extend all the way down to the base 172. Instead, a gap of approximately 4 inches is provided in the platform's base so that the toes of people standing in the aisle can comfortably be placed under the platforms 174.

The two positions of the spans 176 (extended across the aisle and resting on top of the platform 174) allow the posing station to accommodate a range of portrait subjects. Group photographs can be taken by having part of the group stand in the aisle behind others sitting on the platforms. Conversely, extending the spans 176 to bridge the aisle produces a rather expansive surface on which individuals, babies and small children can be photographed.

The expansive area created by the top of the platforms 174 and the extended spans 176 can desirably be covered by a soft material or padding, such as a foam rubber pad, carpeting or the like, to provide a comfortable yet protective surface for the portrait subjects that will sit or lay upon it. In the preferred embodiment, a pliant high density foam mat 198 (e.g., of the type used in athletic mats) of approximately 1½-inch thickness is placed over the exposed surface. The mat 198 desirably extends partially beyond each of the edges of the surface so that the platform's corners are not exposed. The mat 198 can be secured to the surface in any suitable manner, but in the preferred embodiment, four VELCRO-type hook and loop strips, two on each side of the hinge 188, are attached to the exposed surface while corresponding strips are attached to the underside of the mat 198. By placing the strips in a symmetrical pattern in relation to the hinge 188, the mat 198 can be placed on the surface without concern for its orientation.

A second protective cover can also be placed on top of the mat. The cover should desirably be comfortable to lay or sit upon yet also look attractive in a photograph. In the preferred embodiment, a soft velvet cloth is used. The cloth may include a friction-inducing bottom surface that prevents it from slipping with respect to the mat 198.

The underside of the spans 176 can also be covered with padding so that when the spans 176 are retracted, people sitting on them will be comfortable. Any suitable material will suffice and in the preferred embodiment, a resilient foam-filled pad covered by durable vinyl is used.

In the preferred embodiment, the platforms 174 are capable of being removed and then replaced in precisely the same location on the base 172 through use of positioning pegs 184 located on the bottom of the platforms 174, and corresponding receptacles 186 located in the base 172. The pegs 184 preferably are located on the platform in an asymmetrical pattern with respect to at least one of the platform's axes. This ensures that a platform 174 can be positioned with respect to the base 172 in only one way and that, therefore, the photographer cannot accidentally replace a platform 174 backwards. Positioning the platforms 174 on the base 172 in a consistent manner ensures that the spans 176 and storage compartments, discussed below, are always correctly oriented. The pegs 184 and corresponding receptacles 186 can be arranged in any pattern that achieves the above results. Similarly, any suitable number of pegs 184 and receptacles 186 can be used. In the preferred embodiment, four pegs are positioned on the platforms as shown in FIG. 3B.

Figure 3A:
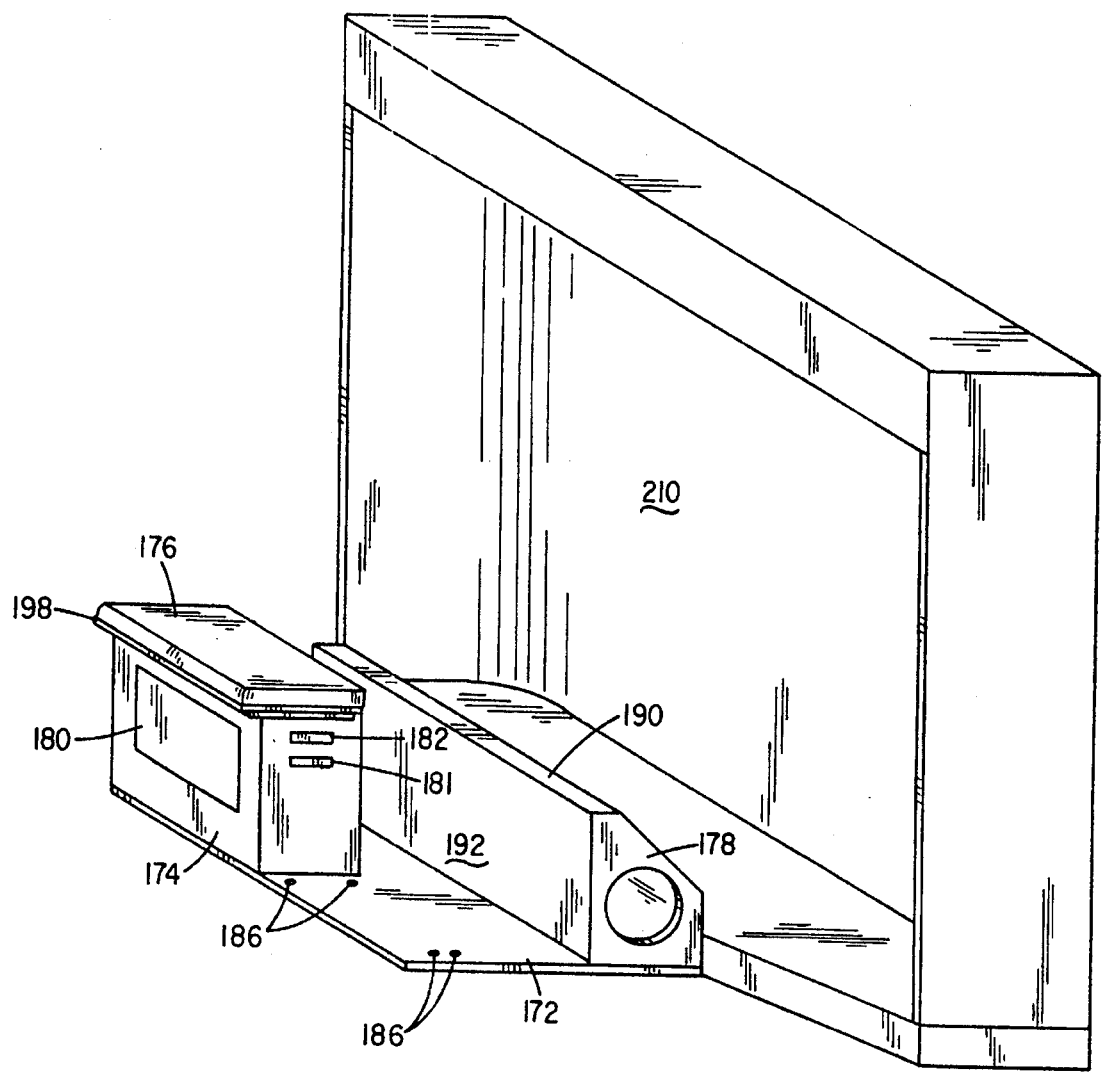
FIG. 3A is a perspective view of the posing station with one platform removed.
Figure 3B:
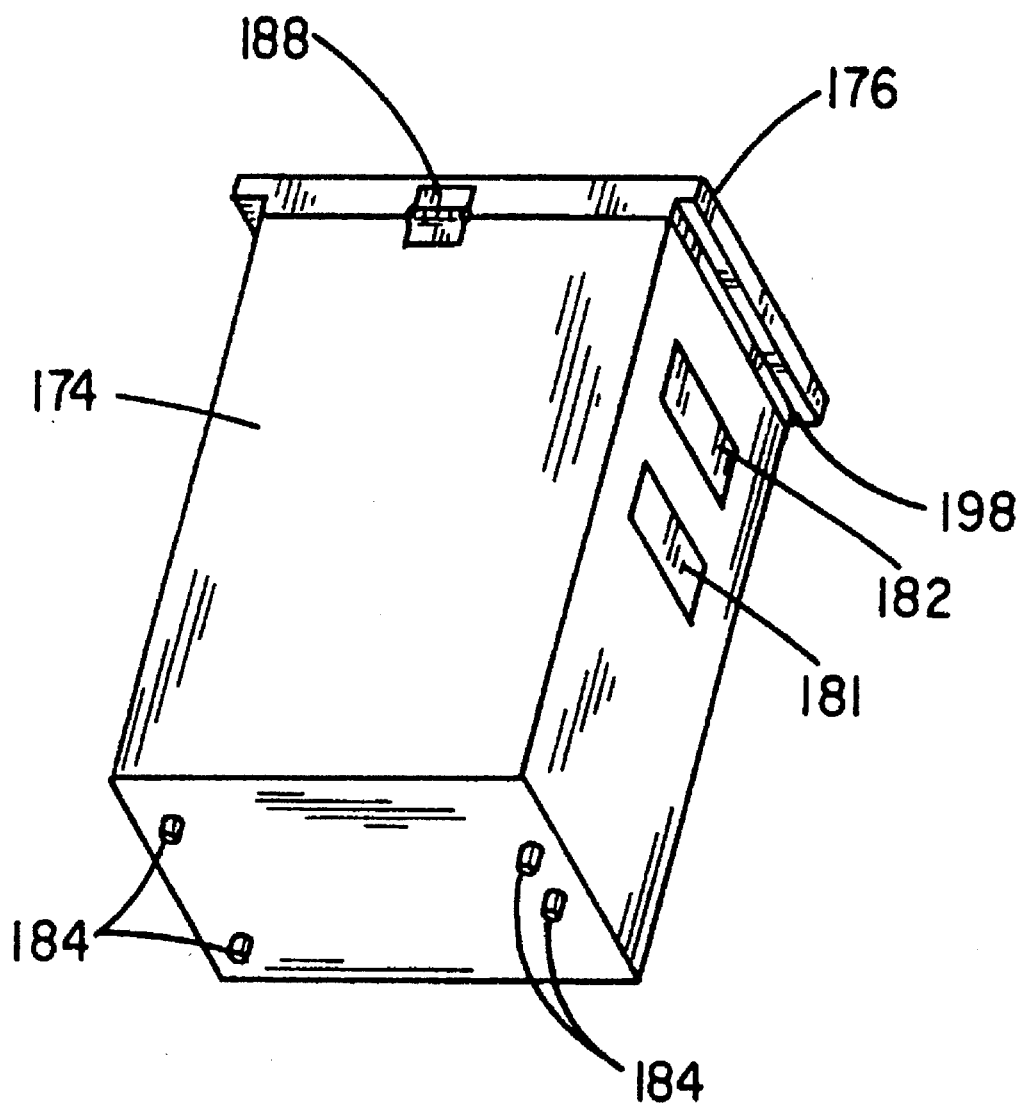
FIG. 3B is a perspective view of the back of the platform showing the positioning pegs.
Figure 4:
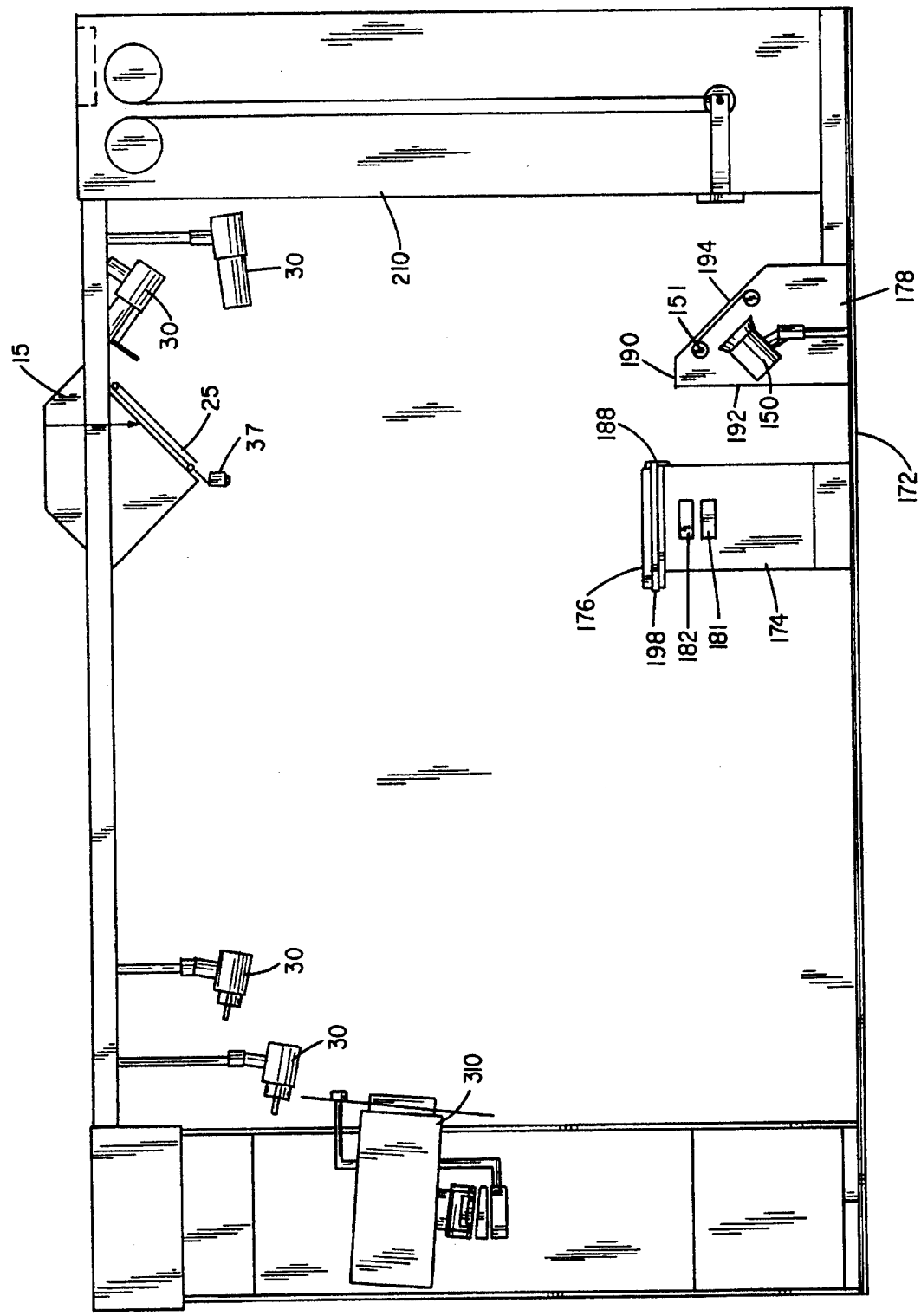
FIG. 4 is a partial cross-sectional view of the portrait studio.

The shape of the positioning pegs and receptacles is not limited to those shown in FIGS. 3A and 3B. There are numerous varieties of peg and receptacle arrangements that would achieve the desired results. In the preferred embodiment the pegs 184 consist of pan head screws threaded into the bottom of the platforms with their heads extending about ⅛"–¼". The receptacles 186 are shaped accordingly to receive the pegs 184, and consist of round holes drilled into the base 172. Obviously the pegs 184 could alternately be carried by the base 172 with the receptacles 186 being located in the platforms 174, or other equivalent means for locating the platforms 174 on the base 172 could be utilized.

The vertical surfaces of the platforms 174 are desirably recessed to form cavities which may be used as storage compartments 180 where equipment or props can be kept. The compartments 180 are particularly helpful when a portrait of an infant or toddler is being taken. During such times, the photographer will typically work in front of the child and use props such as hand puppets or stuffed animals in an attempt to get the child to smile. By having storage compartments in the front of the platforms, the photographer can conveniently reach the toys (which are otherwise out of sight of the child) while remaining attentive to the child.

As a further convenience, in the preferred embodiment, facial tissues are accessible from a holder 181 in the sides of the platforms 174. Additional storage compartments can also be located on the platforms 174 for other objects or equipment. Similarly, the support 178 is desirably hollow for the storage of equipment and, as described below, a background light. Handles 182, which aid in the positioning and handling of the platforms 174 on the base 172, may also be provided on the two lateral sides of the platforms 174 near the platform's top.

In a preferred configuration, a background light 150 is mounted within the support 178. The light 150 can be attached to the support 178 in any suitable manner but should desirably allow the light 150 to illuminate the central portion of the backdrop 210. The background light 150 may also include an automatic or manual gel changer 151 for altering the color of the light used to illuminate the backdrop 210.

In a preferred embodiment, nine gels of different colors and densities are connected end to end to form one continuous roll. Rollers are placed at opposite ends of the background light surface and the gel roll is wound up upon the two rollers and over the background light 150 to form a scroll. By rotating the rollers, any of the gels in the roll can be positioned over the background light 150. The rollers can be rotated manually or they can be motorized. Any suitable motorization method will suffice including the use of a stepper or synchronous motor. However, in the preferred embodiment, a DC gear head motor is employed.

Also in the preferred embodiment, the changing of the gels is automated by linking the motor to a central processing unit 60 or computer. The gels are properly positioned by means of a sensor and/or detection equipment. In the preferred embodiment, bar codes or patches are placed on the individual gels and a sensor capable of reading the bar codes or patches is linked to the computer and placed accordingly near the gel changer. In alternative embodiments, a mechanical sensor is used with a stepper motor or an optical scanner is used with a synchronous motor. The numerous gels and backdrops available can be used in combination to provide a wide variety of portrait background colors.

The platforms 174, spans 176 and support 178 should all be constructed of a lightweight yet strong material. It is important that the platforms 174 be lightweight so that they can be easily moved, yet they must maintain the strength to support the weight of the children and adults who will be positioned on top of them. Furthermore, all of the above components should desirably have smooth surfaces and rounded or otherwise protected edges to reduce the possibility of injury. In the preferred embodiment, the components are made of plywood, particle board, or similar material, desirably covered with Melamine (or similar smooth, durable material) which is laminated to the plywood.

The backdrop 210 is positioned within the background unit 12. On the backdrop 210 can be painted or attached various color arrangements which serve as backgrounds for the portraits that are produced in the studio. The backdrop 210 desirably includes a stabilizer or steering mechanism to ensure that the backdrops are properly positioned behind the posing station 110.

To facilitate the positioning of the portrait subjects, a focus positioning light 37 can be attached to the studio above the posing station 110. The focus positioning light 37 projects the image of its filament upon the posing station 110 desirably at a predetermined focal point. This allows the operator to continuously properly position the subjects on the posing station 110. The video monitor 40 also desirably assists in the positioning of the subjects. In the preferred embodiment, the image seen by the camera 310, is displayed by the video monitor 40. The photographer can then adjust the camera 310 and/or the subjects to the proper positions for the photograph. Also in the preferred embodiment, the video monitor cabinet 15 includes both a horizontal and vertical color monitor. The camera 310, of the type typically found in the art for taking portraits, is desirably operatively connected to both the video monitor 40 and the subject lighting 30 through appropriate electrical means. The camera 310 also desirably includes a remote control to enable the photographer to walk about the studio and/or stand or kneel adjacent the posing station 110 (particularly for small children) as well as to raise and lower the camera 310, move the camera 310 from side to side and zoom the camera 310. Additionally, the remote control could allow the photographer to focus the camera 310 if such a function is desired.

The portrait studio 10 is a relatively compact system which can easily be installed in a short time. To construct the portrait studio, the frame 18 is first erected by positioning the pedestal unit 11, post unit 13 and background unit 12 and attaching the rail system 14 to these units. The subject lighting 30 and video monitor cabinet 15 can then be attached to the overhead beams 20, 24 at the desired locations.

The posing station 170 is assembled by connecting the base 172 to the background unit 13. The background light 150 may be suitably attached within the support 178 and the support 178 in turn secured to the base 172. The platforms 174, with their span 176, can then be positioned on the base 172 by inserting the positioning pegs 184 on the bottom of the platforms 174 into the receptacles 186 located on the base 172.

After the posing station 170 is set up, the camera 310 and lights 30 are electrically connected to each other and a central electrical circuit 50 running through the frame 18. Along with the camera 310 and video monitor 40, the electrical circuit 50 of the portrait studio 110 desirably includes the overhead subject lights 30, the background light 150 and gel changer 151 and any motorized backdrops that may be included in the studio. The electrical circuit 50 is desirably integrated into a single circuit terminating in a conventional 110V plug that can be inserted into a standard electrical wall outlet, supplying all the power needed to run the entire portrait studio 110. Furthermore, the individual components of the portrait studio 110 desirably have the capacity to be linked with a central processing unit 60 which can coordinate their operation, function, and synchronization.

Once the portrait studio 110 has been readied, the taking of photographs is a simple and convenient procedure for the photographer. In the preferred embodiment, a gray card 25 is situated behind the video monitor 40 so that, when lowered, it hangs above the posing station 110. The gray card 25 can be used by the photographer to gather a reading of the light conditions within the portrait studio 110 and thus standardize the photographic conditions. Afterward, the gray card 25, can be replaced unobtrusively behind the video monitor 40.

The subjects are arranged on the posing station 110 in a manner that is aesthetically pleasing considering the size of the group and ages of the subjects. The position of the span 176 with respect to the platforms 174 will depend upon who the portrait subjects are. If a baby or a small child is to be photographed, the spans 176 are extended to cover the aisle between the platforms 179 and the support 178, and the baby is placed in the middle of the expanded surface. The photographer typically will be positioned in front of the child but below the level of the camera lens and can control the camera with the remote control device, preferably zooming the camera 310 in and out and snapping the picture. The photographer may employ the use of props, such as hand puppets or stuffed animals, to get the child to smile for the camera 310. These props can be conveniently stored in the compartments 180 located in the front of the platforms 174 where they are easily accessible.

If a group photograph is desired, the span 176 may be retracted to reside on or within the platforms 174, thereby exposing the aisle. Taller individuals can then stand in the aisle while the other members of the group can sit on the platforms 174. This creates a typical two-level effect whereby all the subjects' faces can easily be seen. The platforms 174 may also be removed from the base 172 if a wider space is needed (such as for photographs with large props or to be accessible to wheel chairs). Once the subjects are correctly posed, the photographer takes the picture.

While a preferred embodiment of the present invention has been described, it should be understood that various changes, adaptations and modifications may be made therein without departing from the spirit of the invention and the scope of the appended claims.

What is claimed is:

1. A photographic posing station for a photographic portrait studio, the portrait studio including a frame assembly for supporting lighting units and a camera, the combination comprising:

a stationary base connected to said frame assembly and resting on a floor of the studio, a rear support attached to the stationary base, and a first removable platform having an upper and bottom surface, said bottom surface resting on the stationary base with positioning means for releasably securing the first platform on the stationary base at a predetermined fixed location nearer to the camera than the rear support to thereby form an aisle in which a portrait subject may stand; and a span that is movable between a first extended position and a second stored position, the span being at least partially supported by both the first platform and the rear support when in the extended position and solely by the first platform when in the second stored position whereby the distances between the camera, lighting units and the first platform remain fixed, with the positing station in the field-of-view of the camera.

2. The posing station of claim 1 wherein the span, when in the first extended position is oriented generally horizontally adjacent the upper surface of the first platform providing a surface on which a portrait subject may reside.

3. The posing station of claim 1 and further including at least one hinge for attaching the span to the first platform.

4. The posing station of claim 1 wherein the positioning means comprises at least one peg extending perpendicularly from one of the bottom surface of the first platform and the stationary base for receipt in corresponding receptacles formed in the other of the bottom surface of the first platform and the stationary base.

5. The posing station of claim 4 including at least 3 such pegs, the pegs being positioned in an asymmetrical pattern whereby when the pegs are located in their respective receptacles, the platform is always located and oriented in the same position.

6. The posing station of claim 1 and further comprising a second platform located sidewise adjacent to the first platform on the stationary base, the second platform including a further span that is movable between a first extended position and a second stored position.

7. The posing station of claim 6 wherein the two platforms form a generally elongated posing surface when the span is in a stored position and a generally square posing surface when the span is in its extended position.

8. The posing station of claim 1 wherein the platform includes walls defining at least one storage compartment and handles for carrying the platform.

9. The posing station of claim 1 wherein the frame includes a backdrop whereby the distance from the platform to the backdrop is fixed.

10. The posing station of claim 1 including background lighting means located on the rear support for illuminating the backdrop.

11. The posing station of claim 10 wherein the background lighting means comprises a background light and a housing for the background light.

12. The combination as in claim 1 wherein the frame assembly comprises at least two columns and at least one overhead beam extending between the columns with the camera coupled to a first of the columns and the stationary base connected to the other of the columns;

a backdrop attached to the other of the columns; and the lighting units being coupled to the overhead beam.

13. The photographic studio of claim 12 wherein the frame includes at least one subject light.

14. The photographic studio of claim 12 including at least one video monitor for displaying images of the photographic subjects.

15. A photographic posing station comprising:

a stationary base and a removable platform having an upper and bottom surface, storage wails defining at least one compartment and handles for carrying the platform;

a span hinged to the platform and movable between a first extended position that is oriented generally horizontally adjacent the upper surface of the platform and a second stored position, the span being at least partially supported by the platform in the extended position;

a support attached to the base and spaced a distance so that the span, in the extended position, rests partially on the support;

positioning means comprising at least three pegs extending downward from the bottom surface of the platform and corresponding receptacles located on the base for receiving the pegs, the pegs being positioned in an asymmetrical pattern whereby when the pegs are located in their respective receptacles, the platform is always located and oriented in the same position;

a frame attached to the base including a backdrop, overhead beams, overhead photographic lights and a photographic camera whereby the distances between the camera, backdrop, overhead lights and platforms remains fixed; and a background light and housing attached to the support for illuminating the backdrop.

* * * * *